US012663099B2

(12) United States Patent
Gao et al.

(10) Patent No.: US 12,663,099 B2
(45) Date of Patent: Jun. 23, 2026

(54) DEVICE AND METHOD FOR ERECTING SUBMARINE PIPELINES IN MARINE ENGINEERING

(71) Applicant: Jiangsu University of Science and Technology, Zhenjiang (CN)

(72) Inventors: Junliang Gao, Zhenjiang (CN); Qixin Liu, Zhenjiang (CN); Linhui Hou, Zhenjiang (CN); Rongjun Sun, Zhenjiang (CN)

(73) Assignee: Jiangsu University of Science and Technology, Zhenjiang (CN)

( * ) Notice: Subject to any disclaimer, the term of this patent is extended or adjusted under 35 U.S.C. 154(b) by 38 days.

(21) Appl. No.: 18/824,097

(22) Filed: Sep. 4, 2024

(65) Prior Publication Data

US 2025/0377052 A1      Dec. 11, 2025

(30) Foreign Application Priority Data

Jun. 11, 2024    (CN) .......................... 202410742652.6

(51) Int. Cl.
F16L 1/20        (2006.01)
F16B 2/10        (2006.01)

(52) U.S. Cl.
CPC .. F16L 1/20 (2013.01); F16B 2/10 (2013.01)

(58) Field of Classification Search
CPC ... B63G 8/001; B63G 2008/005; B63C 11/52; E02B 17/0034; E21B 41/0007; E21B 19/155; F16L 1/20; F16B 2/10
See application file for complete search history.

(56) References Cited

U.S. PATENT DOCUMENTS

| | | | | |
|---|---|---|---|---|
| 1,417,490 | A | * | 5/1922 | Brandon ................. E21B 19/16 |
| | | | | 166/85.5 |
| 3,717,000 | A | * | 2/1973 | Rothwell, Jr. ....... B25J 15/0266 |
| | | | | 29/213.1 |
| 4,082,017 | A | * | 4/1978 | Eckel ...................... E21B 19/16 |
| | | | | 81/57.16 |
| 4,269,554 | A | * | 5/1981 | Jackson .................. E21B 19/14 |
| | | | | 294/90 |
| 4,705,331 | A | * | 11/1987 | Britton .................... B63C 11/52 |
| | | | | 269/254 R |
| 4,893,512 | A | * | 1/1990 | Tanimoto ............. G01N 29/265 |
| | | | | 73/637 |

(Continued)

*Primary Examiner* — Edwin J Toledo-Duran
(74) *Attorney, Agent, or Firm* — Hemisphere Law, PLLC

(57)        ABSTRACT

The disclosure provides a device and a method for erecting submarine pipelines in marine engineering, including: a first bottom plate, a first clamping piece and a second clamping piece, where the first clamping piece includes a moving support and a first clamping jaw, the moving support is arranged on the first bottom plate and driven to move by a moving mechanism, the first clamping jaw is arranged on the moving support for positioning and preliminarily clamping the pipeline; the second clamping piece includes a fixed support and a second clamping jaw, the fixed support is fixed on the first bottom plate, and the second clamping claw is arranged on the fixed support for clamping the pipeline for the second time; the second clamping piece and the first clamping piece are arranged along a first direction, and the first direction is the axial direction of the pipeline.

7 Claims, 7 Drawing Sheets

(56) References Cited

U.S. PATENT DOCUMENTS

| | | | | | |
|---|---|---|---|---|---|
| 5,150,642 | A | * | 9/1992 | Moody | E21B 19/164 81/57.2 |
| 5,263,796 | A | * | 11/1993 | de Waal | F16L 1/201 405/172 |
| 5,458,454 | A | * | 10/1995 | Sorokan | E21B 19/155 414/22.55 |
| 5,609,457 | A | * | 3/1997 | Burns | E21B 19/24 175/85 |
| 5,702,139 | A | * | 12/1997 | Buck | B25B 5/147 81/57.33 |
| 6,237,445 | B1 | * | 5/2001 | Wesch, Jr. | E21B 19/161 81/57.33 |
| 6,263,763 | B1 | * | 7/2001 | Feigel, Jr. | E21B 19/166 81/57.35 |
| 7,013,759 | B1 | * | 3/2006 | Childress, II | E21B 19/163 74/89.17 |
| 8,201,787 | B2 | * | 6/2012 | Ingram | F03D 80/55 248/219.3 |
| 8,235,104 | B1 | * | 8/2012 | Sigmar | E21B 19/164 166/85.1 |
| 8,408,334 | B1 | * | 4/2013 | Orgeron | E21B 19/155 414/22.58 |
| 8,408,617 | B2 | * | 4/2013 | Baylot | F16L 1/235 294/902 |
| 8,550,174 | B1 | * | 10/2013 | Orgeron | E21B 19/24 166/380 |
| 8,939,299 | B2 | * | 1/2015 | Ahler | F03D 13/40 212/270 |
| 9,327,784 | B2 | * | 5/2016 | Bagheri | E04G 3/243 |
| 9,500,049 | B1 | * | 11/2016 | Orgeron | E21B 19/087 |
| 11,808,250 | B2 | * | 11/2023 | Garcia De La Pena | F03D 80/50 |
| 2007/0044592 | A1 | * | 3/2007 | Childress | E21B 19/163 81/57.34 |
| 2009/0056931 | A1 | * | 3/2009 | Kruse | E21B 19/163 166/77.51 |
| 2013/0228397 | A1 | * | 9/2013 | Horn | E04G 3/28 414/800 |
| 2013/0248679 | A1 | * | 9/2013 | Hayden | B62D 7/02 83/743 |
| 2015/0101826 | A1 | * | 4/2015 | Gupta | E21B 19/164 166/77.51 |
| 2015/0107850 | A1 | * | 4/2015 | Mosing | E21B 19/164 81/57.16 |
| 2015/0259993 | A1 | * | 9/2015 | Patel | E21B 19/163 175/52 |
| 2016/0059939 | A1 | * | 3/2016 | Lamonby | G01V 13/00 114/337 |
| 2018/0208283 | A1 | * | 7/2018 | Munro | B63G 8/001 |
| 2019/0136669 | A1 | * | 5/2019 | Wiedecke | E21B 19/165 |
| 2020/0086571 | A1 | * | 3/2020 | De La Torre Ugarte Del Castillo | B29C 64/25 |
| 2021/0293101 | A1 | * | 9/2021 | Søyland | E21B 19/164 |

* cited by examiner

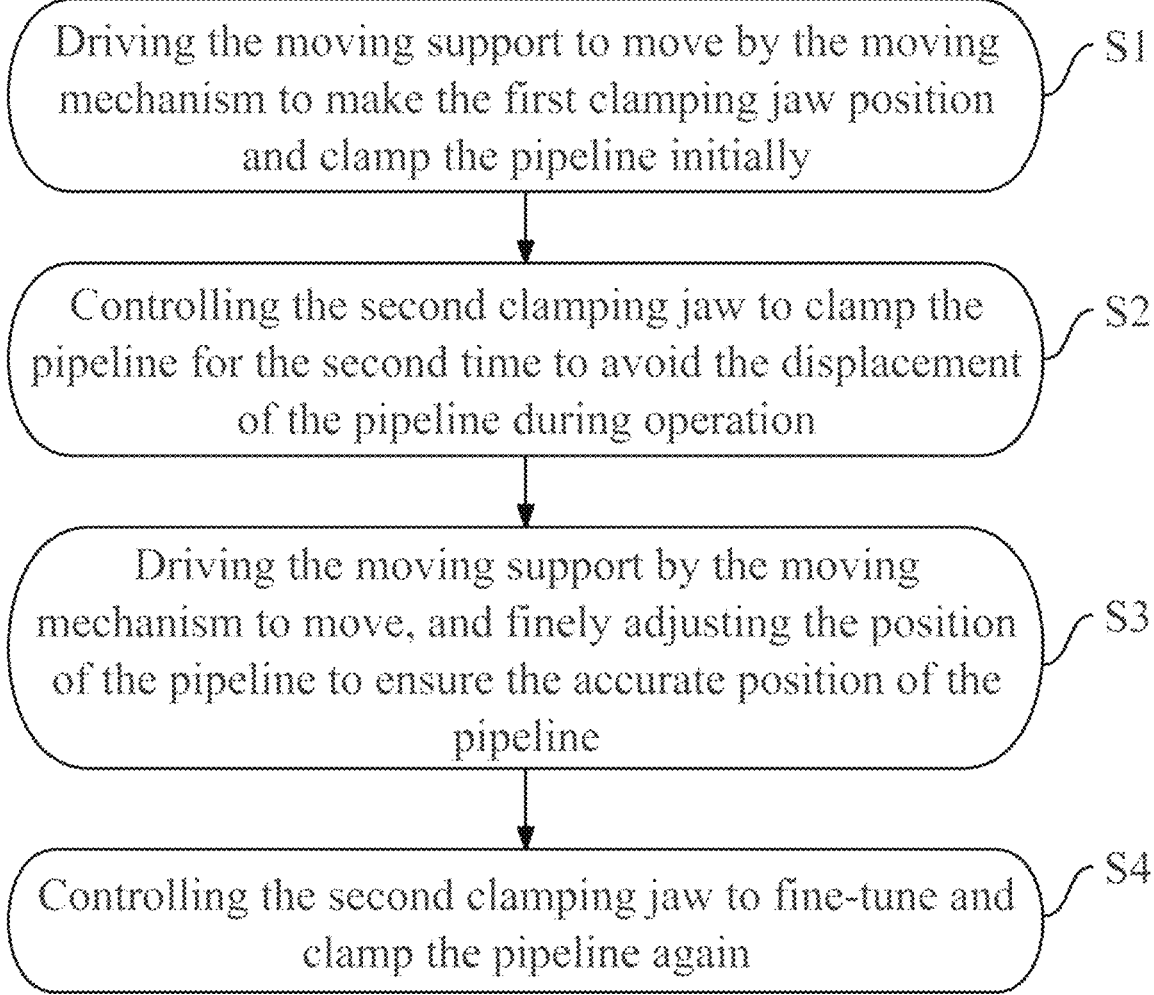

Driving the moving support to move by the moving mechanism to make the first clamping jaw position and clamp the pipeline initially — S1

Controlling the second clamping jaw to clamp the pipeline for the second time to avoid the displacement of the pipeline during operation — S2

Driving the moving support by the moving mechanism to move, and finely adjusting the position of the pipeline to ensure the accurate position of the pipeline — S3

Controlling the second clamping jaw to fine-tune and clamp the pipeline again — S4

FIG. 7

DEVICE AND METHOD FOR ERECTING SUBMARINE PIPELINES IN MARINE ENGINEERING

TECHNICAL FIELD

The disclosure relates to a technical field of marine engineering equipment, and in particular to a device and a method for erecting submarine pipelines in marine engineering.

BACKGROUND

In the field of marine engineering, the erection of submarine pipelines is a key and complicated task, which involves the application of various technologies and equipment to ensure the correct installation and long-term stable operation of pipelines. Submarine pipelines are usually used to transport oil, natural gas or other seabed resources, so it is very important to install these pipelines accurately and safely for the success of the whole project.

At present, the submarine pipeline erection equipment in the prior art mainly relies on heavy machinery and basic hydraulic system for operation. These devices are usually designed as clamping mechanisms with fixed or limited adjustment functions for placing pipelines in predetermined positions. Although this kind of equipment can accomplish basic tasks in some cases, most of them depend on the experience of operators and the interaction of external conditions.

However, the existing technology has obvious shortcomings in operating accuracy, equipment adaptability and stability. First of all, the conventional erection equipment often cannot accurately locate the pipeline due to the lack of accurate control mechanism, especially in complex or irregular seabed terrain. In addition, because the clamping mechanism of the equipment is not flexible enough, making it difficult to adapt to pipes with different diameters or materials, limiting its application range and potentially increasing project cost and time.

SUMMARY

According to the shortcomings of the prior art, the disclosure aims to provide a device and a method for erecting submarine pipelines in marine engineering, which solve the problem that conventional erection equipment often cannot accurately locate pipelines due to the lack of accurate control mechanism.

In order to solve the technical problems, the technical scheme adopted by the disclosure is as follows:

In a first aspect, the present disclosure provides a device for erecting submarine pipelines in marine engineering, including:

a first bottom plate;

a first clamping piece includes a moving support and a first clamping jaw, where the moving support is arranged on the first bottom plate and driven to move by a moving mechanism, and the first clamping jaw is arranged on the moving support, and the first clamping jaw is used for positioning and preliminarily clamping the pipeline;

a second clamping piece includes a fixed support and a second clamping jaw, where the fixed support is fixed on the first bottom plate, the second clamping jaw is arranged on the fixed support, and the second clamping jaw is used for clamping the pipeline for the second time;

the second clamping piece and the first clamping piece are arranged along a first direction, and the first direction is the axial direction of the pipeline.

Further, the disclosure also includes a second bottom plate, where the second bottom plate is fixed on the seabed and arranged below the first bottom plate, and a buffer mechanism for buffering the first bottom plate is arranged on the second bottom plate.

Further, the buffer mechanism includes one or more first buffer pieces, and the first buffer pieces include elastic bodies, the elastic bodies are arranged on the second bottom plate along the first direction in a sliding way, and both ends of the elastic bodies are provided with first rotating rods, both ends of the first rotating rods are rotatably connected with the elastic bodies and the first bottom plate respectively.

Further, the first buffer piece also includes limit plates, and the two limit plates are fixed on the second bottom plate at a certain distance and connected through a cross bar. The elastic body includes a spring and sliders, and the two sliders are slidably arranged on the cross bar. The spring is sleeved on the cross bar with both ends fixed with the two sliders respectively, and each slider is rotatably connected with the first bottom plate through the first rotating rod.

Further, the buffer mechanism also includes one or more second buffer pieces, and the second buffer pieces are arranged in the vertical direction.

Further, the moving mechanism includes a moving driver and a slide rail, where the moving support is slidably arranged on the slide rail, and the moving driver drives the moving support to move along the extending direction of the slide rail, and the extending direction of the slide rail is a second direction, the second direction is perpendicular to the first direction and the vertical direction.

Further, a limiting mechanism is also included, the limiting mechanism includes a rack and a gear, where the rack is fixed on the first bottom plate, the gear is arranged on the moving support and meshed with the rack, and the extension direction of the rack is the second direction.

Further, the first clamping jaw includes two first clamping plates oppositely arranged along the second direction, and the two first clamping plates are respectively driven to rotate around the first direction by a rotation driver.

Further, the second clamping jaw includes two second clamping plates oppositely arranged along the second direction, a lifting driver is arranged on the fixed support, and the top of the lifting driver is rotatably connected with two second rotating rods distributed in a V shape, and the two second rotating rods are respectively fixed with the two second clamping plates.

In a second aspect, the present disclosure provides a method for erecting submarine pipelines in marine engineering, which is applied to the above-mentioned device for erecting submarine pipelines in marine engineering, and the method includes the following steps:

S1, driving the moving support to move by the moving mechanism to make the first clamping jaw position and clamp the pipeline initially;

S2, controlling the second clamping jaw to clamp the pipeline for the second time to avoid the displacement of the pipeline during operation;

S3, driving the moving support by the moving mechanism to move, and finely adjusting the position of the pipeline to ensure the accurate position of the pipeline; and S4, controlling the second clamping jaw to fine-tune and clamp the pipeline again.

Compared with the prior art, the disclosure has following advantages and beneficial effects:

The disclosure provides a device and a method for erecting the submarine pipelines in marine engineering, where the first clamping piece is movable and the second clamping piece is immovable, this design is intended to provide greater flexibility and stability in different environments and requirements. The first clamping piece adjusts the position of the pipeline in the complex terrain of the seabed to accurately locate the pipeline, increasing the adaptability of the equipment and the flexibility of operation; the second clamping piece provides a fixed support point, ensuring that the pipeline has a stable fixed point during installation. During the specific operation, the first clamping piece adjusts the position in the initial stage to preliminarily fix the pipeline, and then the second clamping piece provides stable support to prevent the pipeline from being displaced during the operation. Next, the first clamping piece is further fine-tuned to ensure the accurate position of the pipeline, and the second clamping piece ensures that the pipeline is firmly fixed, thus ensuring the stable operation of the whole device in the complex seabed environment.

BRIEF DESCRIPTION OF THE DRAWINGS

The accompanying drawings are provided to provide a further understanding of the disclosure and constitute a part of this application. Exemplary embodiments of the present disclosure and their descriptions are used to explain the present disclosure, and do not constitute undue limitations on the present disclosure.

FIG. 7 is a flowchart of the method of the present disclosure.

Figure 1:
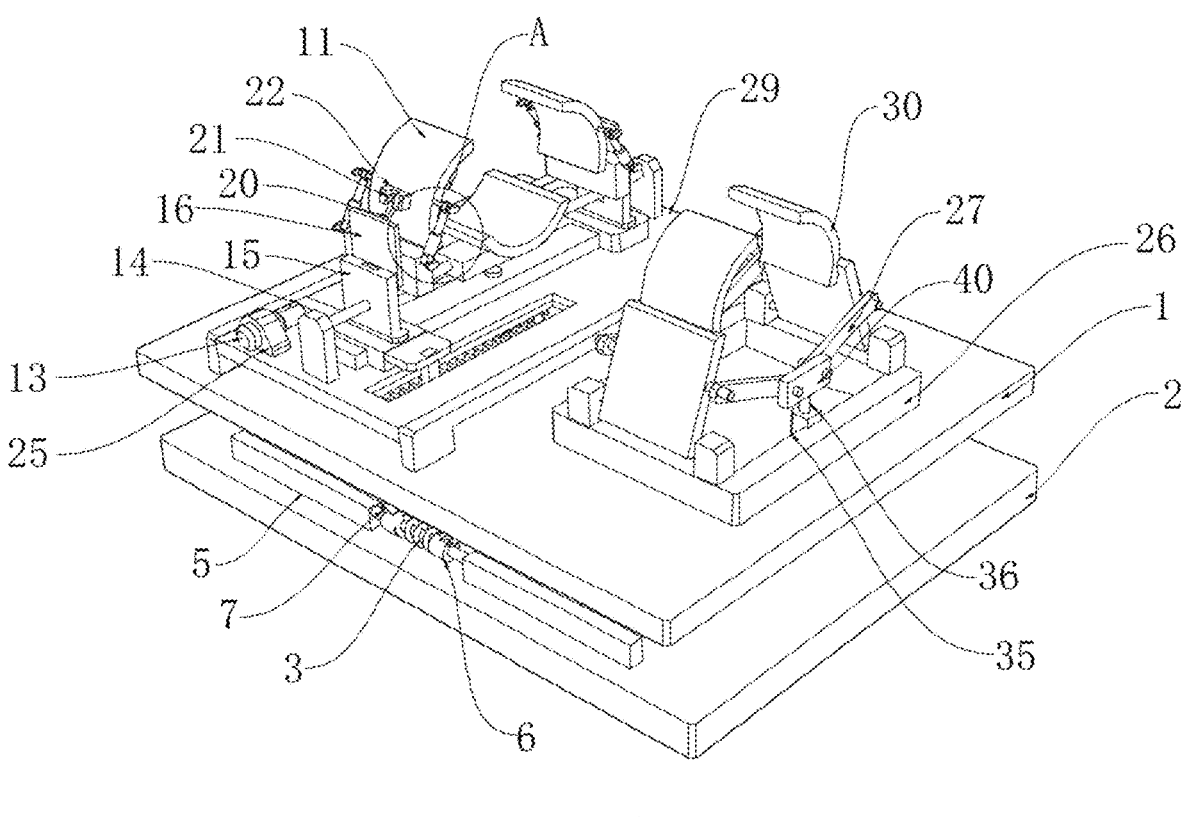
FIG. 1 is a schematic view of the overall structure of the present disclosure from a first angle.

In the figures, 1. first bottom plate; 2. second bottom plate; 3. first spring; 4. first rotating rod; 5. first limit plate; 6. slider; 7. cross bar; 8. damper; 9. second spring; 10. slide rail; 11. first clamping plate; 12. placing plate; 13. first hydraulic rod; 14. second connecting plate; 15. second limit plate; 16. side plate; 17. first limit column; 18. second connecting block; 19. second hydraulic rod; 20. third rotating rod; 21. second fixed block; 22. first supporting plate; 23. rack; 24. gear; 25. fixed frame; 26. fixed support; 27. second rotating rod; 28. second supporting plate; 29. bracket; 30. second clamping plate; 31. first connecting block; 32. second limit column; 33. supporting seat; 34. slide bar; 35. second limit block; 36. air cylinder; 37. clamping base; 38. Clamping substrate; 39. first fixed block; and 40. third limit plate.

DETAILED DESCRIPTION OF THE EMBODIMENTS

In the following, the technical scheme in the embodiment of the disclosure is described clearly and completely with the attached drawings.

In the description of the present invention, it is to be understood that the terms "center", "vertical", "horizontal", "up", "down", "front", "back", "left", "right", "transverse", "longitudinal", "top", "bottom", "inner", "outer" etc. indicate relative positioning or orientation based on the orientation or positioning shown in the drawings, merely for the purpose of conveniently describing the present invention and simplifying the description, and are not intended to indicate or imply that the device or element so indicated must have a specific orientation, be constructed or operated in a specific orientation, and therefore cannot be understood as a limitation on the present invention. Furthermore, the terms "first", "second" etc. are used for descriptive purposes only and cannot be understood as indicating or implying relative importance or implying the number of the indicated technical features. Thus, the features designated with "first", "second" etc. may explicitly or implicitly include one or more of the features. In the description of the present invention, unless otherwise stated, the meaning of "multiple" is two or more.

Embodiment 1

Figure 2:
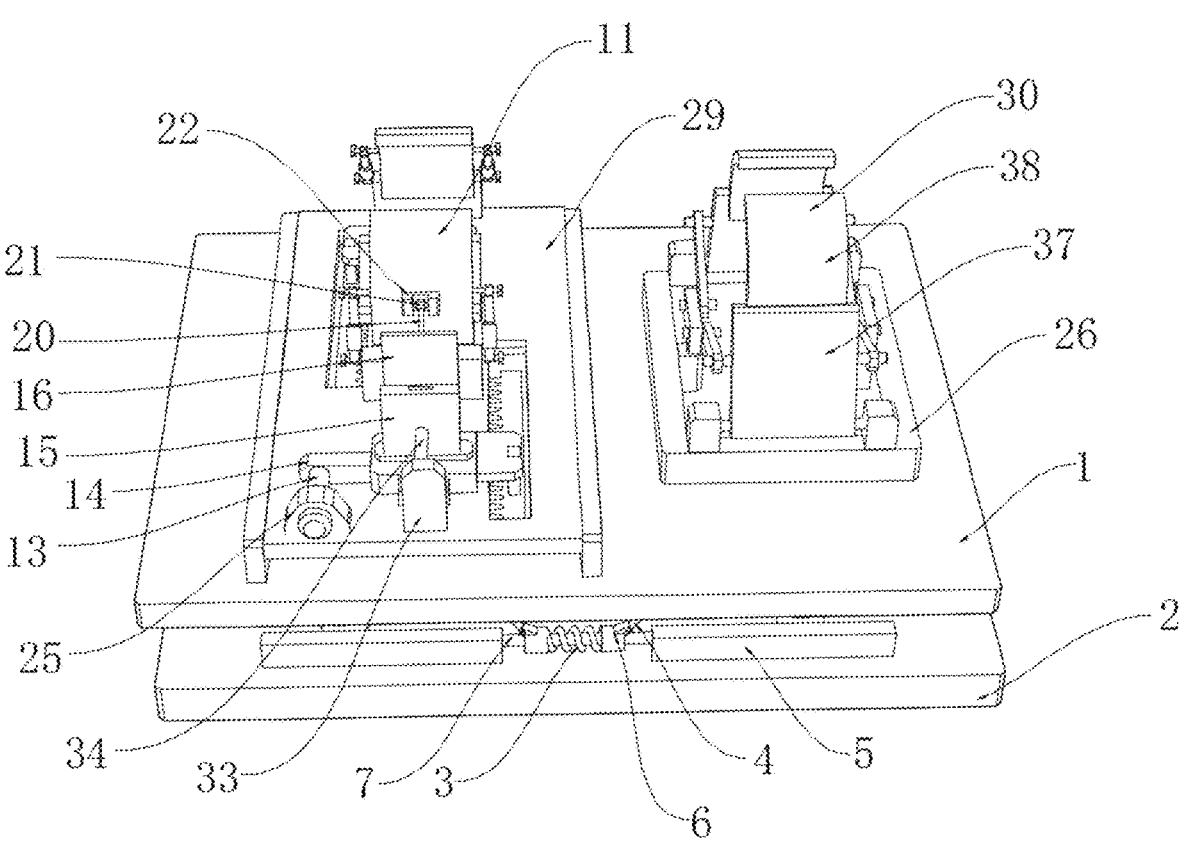
FIG. 2 is a schematic diagram of the overall structure of the disclosure from the second angle.

A device for erecting submarine pipelines in marine engineering is provided in the first embodiment, as shown in FIG. 1-FIG. 2, including a first bottom plate 1, a first clamping piece and a second clamping piece, where the first bottom plate 1 is used as a base for erecting pipelines, the first clamping piece is used for positioning and preliminarily clamping pipelines, and the second clamping piece is used for clamping pipelines for the second time.

The first bottom plate 1 is arranged on the seabed.

The first clamping piece includes a moving support and a first clamping jaw, where the moving support is arranged on the first bottom plate 1 and driven to move by a moving mechanism; the first clamping jaw is arranged on the moving support and is used for positioning and preliminarily clamping the pipeline.

The second clamping piece includes a fixed support 26 and a second clamping jaw, where the fixed support 26 is fixed on the first bottom plate 1, the second clamping jaw is arranged on the fixed support 26, and the second clamping jaw is used for clamping the pipeline for the second time.

The second clamping piece and the first clamping piece are arranged along a first direction, and the first direction is the axial direction of the pipeline.

The first embodiment provides a submarine pipeline erection device for marine engineering. The first clamping piece is movable and the second clamping piece is immovable, this design is intended to provide greater flexibility and stability in different environments and requirements. The first clamping piece adjusts the position of the pipeline in the complex terrain of the seabed to accurately locate the pipeline, increasing the adaptability of the equipment and the flexibility of operation; the second clamping piece provides a fixed support point, ensuring that the pipeline has a stable fixed point during installation. During the specific operation, the first clamping piece adjusts the position in the initial stage to preliminarily fix the pipeline, and then the second clamping piece provides stable support to prevent the pipeline from being displaced during the operation. Next, the first clamping piece is further fine-tuned to ensure the accurate position of the pipeline, and the second clamping piece ensures that the pipeline is firmly fixed, thus ensuring the stable operation of the whole device in the complex seabed environment.

Figure 4:
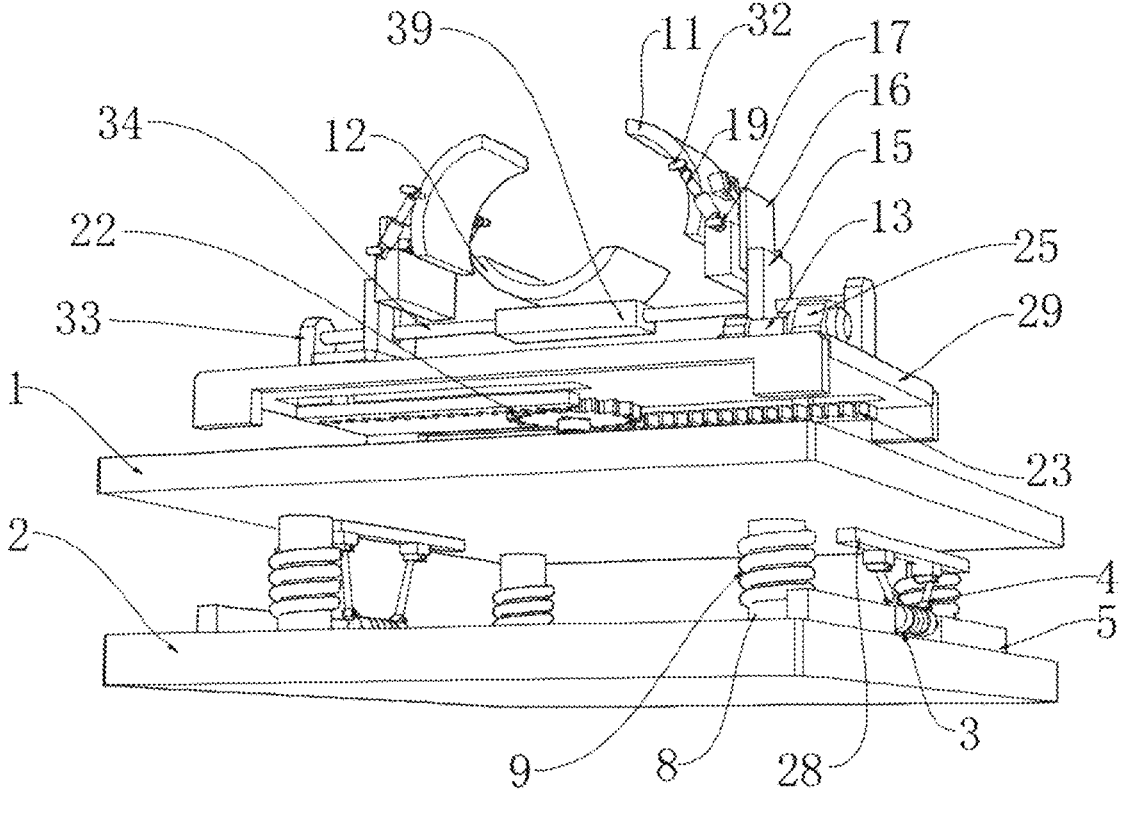
FIG. 4 is a schematic structural view of a first clamping piece in the second angle of the present disclosure.
Figure 5:
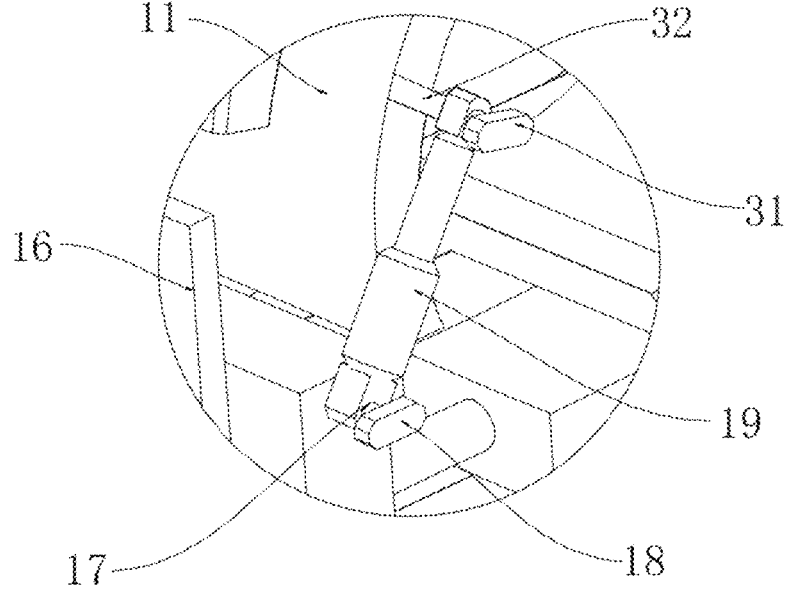
FIG. 5 is an enlarged view at A in FIG. 1.
Figure 6:
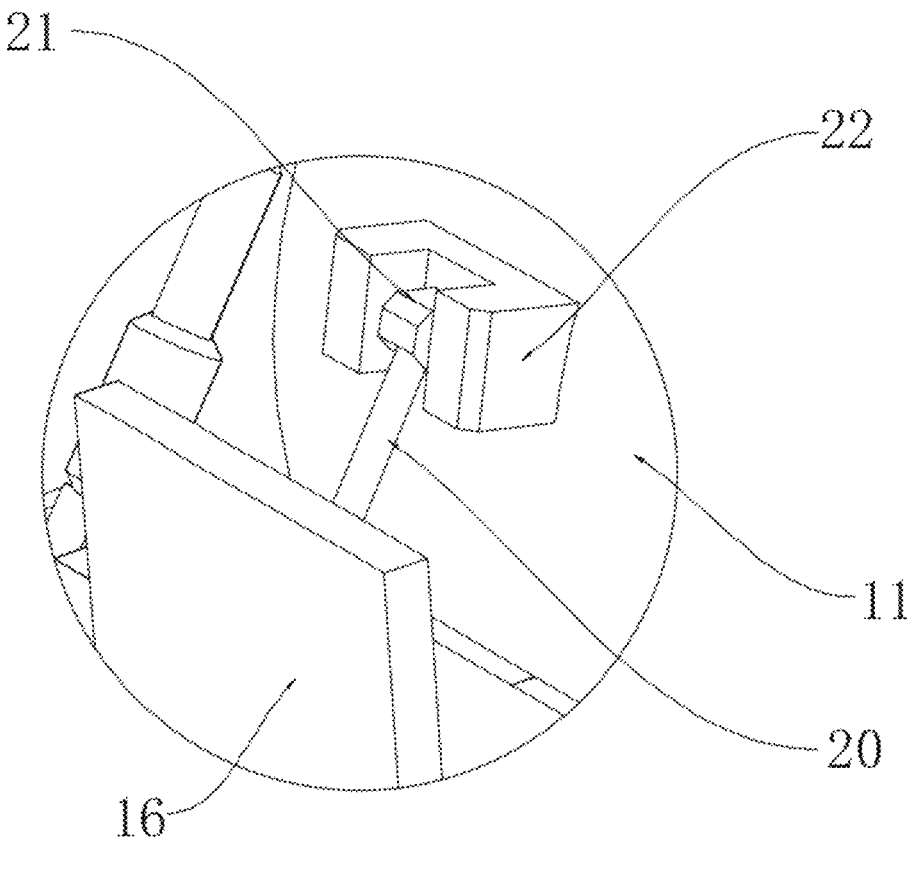
FIG. 6 is an enlarged view at B in FIG. 3.

In this embodiment, as shown in FIG. 2 and FIG. 4, the offshore pipeline erection device further includes a second bottom plate 2, the second bottom plate 2 is fixed on the seabed and arranged below the first bottom plate 1, and a buffer mechanism for buffering the first bottom plate 1 is arranged on the second bottom plate 2.

The existing equipment lacks effective mechanical buffering and stability design when facing the common problems of pressure and vibration in submarine operation, which may lead to equipment failure or inaccurate pipeline positioning during installation, further increasing the safety risk. The buffer device provided by this embodiment play a buffering role for the device for erecting submarine pipelines in marine engineering.

In some embodiments of this embodiment, as shown in FIG. 2 and FIG. 4, the buffer mechanism includes one or more first buffer pieces, and the first buffer pieces include elastic bodies, the elastic bodies are arranged on the second bottom plate 2 along the first direction in a sliding manner, and both ends of the elastic bodies are provided with first rotating rods 4, both ends of the first rotating rods 4 are rotatably connected with the elastic bodies and the first bottom plate 1 respectively. By setting the first piece, the equipment is ensured to move the first bottom plate 1, the first clamping piece and the second clamping piece in the first direction when facing the common pressure and vibration in submarine operations, without affecting the pipeline entering the first clamping piece and the second clamping piece, thus preventing the first bottom plate 1, the first clamping piece and the second clamping piece from shaking in the radial direction of the pipeline, and solving the problem about the inability of precise erection of the pipeline.

The first buffer also includes first limit plates 5, and the two first limit plates 5 are fixed on the second bottom plate 2 at a certain distance and connected through a cross bar 7. The elastic body includes a first spring 3 and sliders 6, and the two sliders 6 are slidably arranged on the cross bar 7, so that the sliders 6 are movable along the cross bar 7. The first spring 3 is arranged between the two sliders 6, and the first spring 3 is sleeved on the cross bar 7 with both ends fixed to the two sliders 6 respectively. Each slider 6 is rotatably connected with the first bottom plate 1 through the first rotating rod 4, the first spring 3 provides necessary elasticity and buffering to reduce shock and impact.

Specifically, the bottom of the first bottom plate 1 is fixedly connected with a second supporting plate 28, and the bottom of the second supporting plate 28 is rotatably connected with two first rotating rods 4 at a certain distance; each first rotating rod 4 is rotatably connected with a slider 6, and the two sliders 6 are slidably connected with the cross bar 7 at a certain distance, the cross bar 7 is sleeved with the first spring 3, and the cross bar 7 is fixedly connected with the first limit plates 5; the bottoms of the first limit plates 5 are on the second bottom plate 2, and the second bottom plate 2 is fixed on the seabed. By setting the first limit plates 5, the stability is further increased.

As shown in FIG. 2 and FIG. 4, the second bottom plate 2 is fixedly connected with a damper 8, and the outer wall of the damper 8 is sheathed with a second spring 9. One end of the second spring 9 is fixedly connected to the lower surface of the first bottom plate 1, and the other end is fixed to the upper surface of the second bottom plate 2. This composite damping system effectively absorbs the extra power generated during operation and protects the device from sudden impact.

In some implementations of this embodiment, the number of the first buffer piece and the second buffer piece is one or more.

In this embodiment, the moving mechanism includes a moving driver and a slide rail 10, the moving support is slidably arranged on the slide rail 10, the moving driver drives the moving support to move along the extending direction of the slide rail 10, and the extending direction of the slide rail 10 is a second direction, the second direction is perpendicular to the first direction and the vertical direction.

In this embodiment, as shown in FIG. 1-FIG. 4, the first clamping jaw includes two first clamping plates 11, the two first clamping plates 11 are oppositely arranged along the second direction, and the two first clamping plates 11 are respectively driven to rotate around the first direction by a rotation driver.

In this embodiment, as shown in FIG. 1-FIG. 4, the movable bracket is further provided with a placing plate 12, the placing plate 12 is arranged between two first clamping plates 11, and the inner surfaces of the placing plate 12 and the two clamping plates are both adapted to the shape of the pipeline.

Specifically, as shown in FIG. 1-FIG. 6, the upper surface of the first bottom plate 1 is fixedly connected with a bracket 29, and the upper surface of the bracket 29 is fixedly connected with a fixed frame 25, and the inside of the fixed frame 25 is fixedly connected with a first hydraulic rod 13, and the output end of the first hydraulic rod 13 is fixedly connected with the moving support, and the first hydraulic rod 13 is a movable drive, and the moving support includes two movable sub-seats oppositely arranged along the second direction. The movable sub-seat includes a second connecting plate 14, a second limit plate 15 and a side plate 16, where the upper surface of the first bottom plate 1 is fixedly connected with the slide rail 10, the inner wall of the second connecting plate 14 is slidably connected with the outer wall of the slide rail 10, the upper surface of the second connecting plate 14 is fixedly connected with the second limit plate 15, one side of the outer wall of the second limit plate 15 is fixedly connected with the side plate 16, and the outer wall of the side plate 16 is fixedly connected with a first limit column 17. The outer wall of the first limit column 17 is rotatably connected with a second connecting block 18, and one side of the outer wall of the second connecting block 18 is fixedly connected with a second hydraulic rod 19; the output end of the second hydraulic rod 19 is fixedly connected with a first connecting block 31, and the inside of the first connecting block 31 is rotatably connected with a second limit column 32; one end of the second limit column 32 is fixedly connected with the first clamping plate 11, and the second hydraulic rod 19 is a rotary drive. The outer wall of the side plate 16 is rotatably connected with a third rotating rod 20, and the third rotating rod 20 is fixedly connected with a second fixed block 21; one side of the outer wall of the first clamping plate 11 is fixedly connected with a first supporting plate 22, and the outer wall of the second fixed block 21 is rotatably connected inside the first supporting plate 22.

In one embodiment, when the operation starts, the first hydraulic rod 13 is activated to push the second connecting plate 14 to slide along the slide rail 10, this movement is realized by the linear driving force generated by the hydraulic rod, thus ensuring the accuracy and controllability of the movement; with the movement of the second connecting plate 14, the position of the first clamping plate 11 is adjusted by the first connecting block 31, this adjustment allows the clamping plate to expand or contract properly according to the size of the pipeline, thus realizing the stable clamping of the pipeline; the second hydraulic rod 19 further adjusts the position of the first connecting block 31, so that the first clamping plate 11 is capable of adjusting its contact angle with the pipeline when necessary, this is achieved by the second connecting block 18 and the related rotating mechanism, thus ensuring that the pipeline can be safely fixed at any required angle; in the whole operation process, the side plate 16 and the third rotating rod 20 provide additional structural support, and cooperate with the second fixed block 21 and the first supporting plate 22 to further enhance the stability and safety of the device in the erection process.

Specifically, by integrating the first hydraulic rod 13 and the second connecting plate 14, the device is capable of realizing accurate pipeline movement and positioning, and is capable of greatly improving the accuracy and efficiency of submarine pipeline installation. This control mechanism is especially suitable for complex seabed topography, ensuring the accuracy and stability of pipeline installation. The device takes into account different sizes and types of pipelines. Through the adjustable first clamping plate 11 and the multi-directional adjustable second hydraulic rod 19, the device flexibly adapts to pipelines with various diameters and materials, reducing the need for additional equipment and improving the flexibility and economic efficiency of operation. During the operation, through the structural design of the slide rail 10 and the second supporting plate 28, the pressure and vibration caused by the submarine operation are effectively dispersed and absorbed, the stability of the device is enhanced, and the risks in the operation process are reduced.

Figure 3:
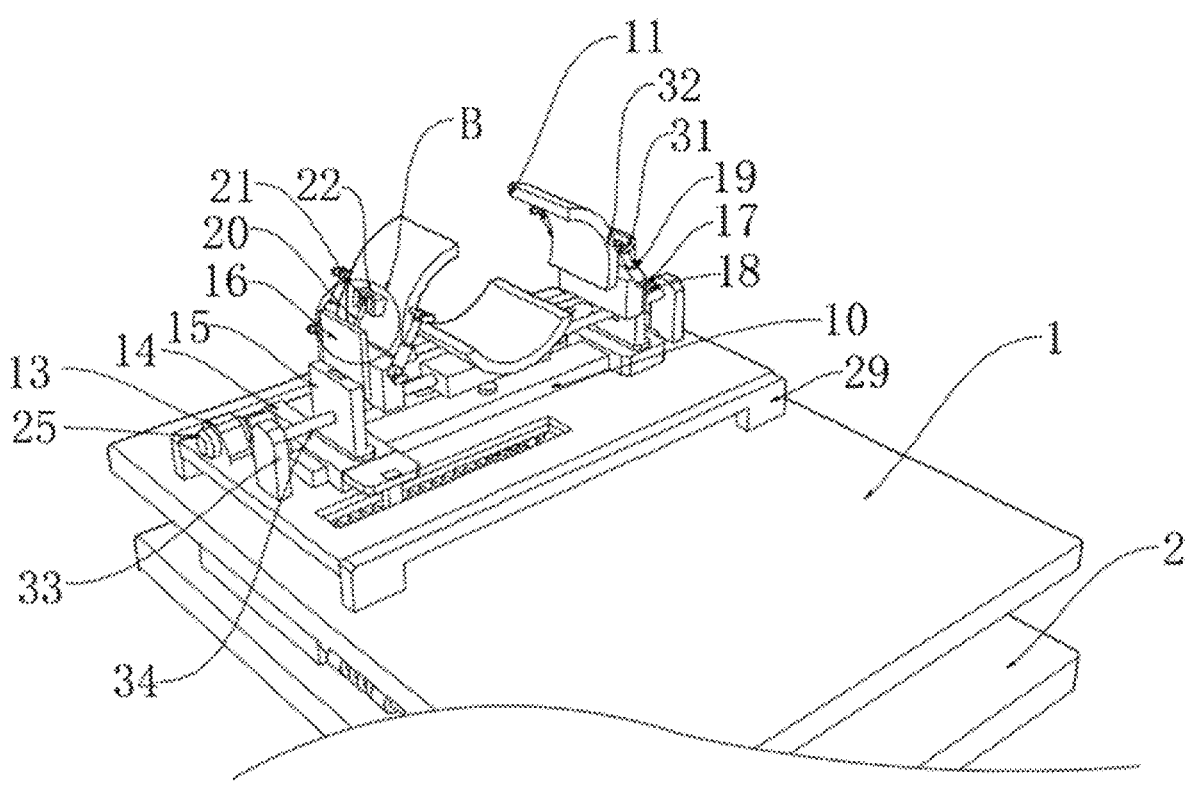
FIG. 3 is a schematic structural view of a first clamping piece in the first angle of the present disclosure.

This embodiment also includes a limiting mechanism. As shown in FIG. 3 and FIG. 4, the limiting mechanism includes a rack 23 and a gear 24. The rack 23 is fixed on the moving support, and the gear 24 is fixed on the first bottom plate 1 and meshed with the rack 23. The extension direction of the rack 23 is the second direction.

Specifically, the lower surface of the second connecting plate 14 is fixed with the rack 23 meshing with the gear 24 on a limiting rod fixed in the slide rail 10. This design allows the rack 23 to move along with the movement of the second connecting plate 14, and the rotation of the gear 24 converts linear motion into rotary motion or converts rotary motion into linear motion, thus providing a stable and controllable mechanical transmission and enhancing the accuracy and repeatability of pipeline positioning. Through the accurate meshing of the gear 24 and the rack 23, the disclosure provides an extremely accurate control mechanism, and enables the device to adjust the position of the pipeline with extremely high precision.

In this embodiment, the first limit plate 5 is slidably connected with the outer wall of the connecting rod through its inner wall. This sliding mechanism allows the first limit plate 5 to adjust its position accurately under the guidance of the connecting rod, thus ensuring the stability and accuracy in the operation process.

In this embodiment, in order to further restrict the movement of the two first clamping plates 11, two supporting seats 33 are arranged on the bracket 29 at a certain distance, and at least one slide bar 34 is fixed between the two supporting seats 33, and the extension direction of the slide bar 34 is the second direction. The two second limit plates 15 penetrate through the slide bar 34 and are capable of sliding along the extension direction of the slide bar 34, and the movement direction of the two first clamping plates 11 is further limited to the second direction by setting the slide bar 34. The first fixed block 39 is fixed on the slide bar 34, and the placing plate 12 is fixed on the first fixed block 39. This configuration enhances the structural stability of the whole equipment.

The second jaw includes two second clamping plates 30 oppositely arranged along the second direction. The fixed support 26 is provided with a lifting driver, and the top of the lifting driver is rotatably connected with two second rotating rods 27 distributed in a V shape, and the two second rotating rods 27 are respectively fixed with the two second clamping plates 30.

The upper surface of the first bottom plate 1 is fixedly connected with a fixed support 26; the upper surface of the fixed support 26 is fixedly connected with a second limit block 35, an air cylinder 36 is fixedly connected with the second limit block 35, and the output end of the air cylinder 36 is fixedly connected with a third limit plate 40; the inside of the third limit plate 40 is rotatably connected with the second rotating rod 27, and the outer wall of the second rotating rod 27 is fixedly connected with the second clamping plate 30.

The fixed support 26 is fixed on the first bottom plate 1 to provide structural support, and a second limit block 35 is fixed on it. One side of the second limit block 35 is also fixed with the air cylinder 36, and the output end of the air cylinder 36 is connected with the third limit plate 40. The function of the air cylinder 36 is to provide power output, and more detailed dynamic adjustment is realized through the third limit plate 40 to meet different operating requirements; the second rotating rod 27 in the third limit plate 40 provides a rotating function, and the second clamping plate 30 is fixed on the outer wall of the second rotating rod 27. This design allows the second clamping plate 30 to rotate according to the work needs, thus realizing the stable clamping of pipelines or other work objects and increasing the flexibility and adaptability of operation.

Specifically, the second clamping plate 30 includes a clamping base 37 and a clamping substrate 38. The clamping base 37 and the fixed support 26 are rotatably connected through a rotating shaft. The clamping substrate 38 is fixed on the clamping base 37, and the outer wall of the second rotating rod 27 is fixedly connected with the clamping base 37.

This embodiment ensures the stability of the structure as well as the effective output of power, ensures the efficient and safe operation execution in a complex submarine environment, and reduces the risk caused by device instability or position error. By combining the precise sliding and limiting mechanism with the power output of the air cylinder 36, this device is capable of realizing fine position adjustment and stable action execution, thus significantly improving the operational stability and accuracy of submarine pipeline erection.

Embodiment 2

As shown in FIG. 7, a method for erecting submarine pipelines in marine engineering is provided in the second embodiment, including the following steps:
   S1, driving the moving support to move by the moving mechanism to make the first clamping jaw position and clamp the pipeline initially;
   S2, controlling the second clamping jaw to clamp the pipeline for the second time to avoid the displacement of the pipeline during operation;

S3, driving the moving support by the moving mechanism to move, and finely adjusting the position of the pipeline to ensure the accurate position of the pipeline; and S4, controlling the second clamping jaw to fine-tune and clamp the pipeline again.

Obviously, those skilled in the art can make various modifications and variations to the present disclosure without departing from the spirit and scope of the present disclosure. Thus, it is intended that the present disclosure include these modifications and variations provided that they are within the scope of the claims and their equivalents.

What is claimed is:

1. A device for erecting submarine pipelines in marine engineering, comprising:

a first bottom plate;

a first clamping piece, comprising a moving support and a first clamping jaw, wherein the moving support is arranged on the first bottom plate and driven to move by a moving mechanism, and the first clamping jaw is arranged on the moving support, and the first clamping jaw is used for positioning and preliminarily clamping the pipeline;

a second clamping piece, comprising a fixed support and a second clamping jaw, wherein the fixed support is fixed on the first bottom plate, the second clamping jaw is arranged on the fixed support, and the second clamping jaw is used for clamping the pipeline for the second time;

wherein the second clamping piece and the first clamping piece are arranged along a first direction, and the first direction is the longitudinal direction of the pipeline;

wherein the device further comprises a second bottom plate, the second bottom plate is fixed on the seabed and arranged below the first bottom plate, and a buffer mechanism for buffering the first bottom plate is arranged on the second bottom plate;

wherein the buffer mechanism comprises one or more first buffer pieces, and the first buffer pieces comprise elastic bodies, the elastic bodies are arranged on the second bottom plate along the first direction in a sliding way, and both ends of the elastic bodies are provided with first rotating rods, both ends of the first rotating rods are rotatably connected with the elastic bodies and the first bottom plate respectively; and wherein the first buffer piece further comprises limit plates, and the two limit plates are fixed on the second bottom plate at a certain distance and connected through a cross bar; the elastic body comprises a spring and sliders, and the two sliders are slidably arranged on the cross bar; the spring is sleeved on the cross bar with both ends fixed with the two sliders respectively, and each slider is rotatably connected with the first bottom plate through the first rotating rod.

2. The device for erecting submarine pipelines in marine engineering according to claim 1, wherein the buffer mechanism also comprises one or more second buffer pieces, and the second buffer pieces are arranged in the vertical direction.

3. The device for erecting submarine pipelines in marine engineering according to claim 1, wherein the moving mechanism comprises a moving driver and a slide rail, wherein the moving support is slidably arranged on the slide rail, the moving driver drives the moving support to move along the extending direction of the slide rail, the extending direction of the slide rail is a second direction, and the second direction is perpendicular to the first direction and the vertical direction.

4. The device for erecting submarine pipelines in marine engineering according to claim 3, wherein a limiting mechanism is also comprised, the limiting mechanism comprises a rack and a gear, wherein the rack is fixed on the first bottom plate, the gear is arranged on the moving support and meshed with the rack, and the extension direction of the rack is the second direction.

5. The device for erecting submarine pipelines in marine engineering according to claim 3, wherein the first clamping jaw comprises two first clamping plates oppositely arranged along the second direction, and the two first clamping plates are respectively driven to rotate around the first direction by a rotation driver.

6. The device for erecting submarine pipelines in marine engineering according to claim 3, wherein the second clamping jaw comprises two second clamping plates oppositely arranged along the second direction, a lifting driver is arranged on the fixed support, and the top of the lifting driver is rotatably connected with two second rotating rods distributed in a V shape, and the two second rotating rods are respectively fixed with the two second clamping plates.

7. A method for erecting submarine pipelines in marine engineering, which is applied to the device for erecting submarine pipelines in marine engineering according to claim 1, wherein the method comprises the following steps:

S1, driving the moving support to move by the moving mechanism to make the first clamping jaw position and clamp the pipeline initially;

S2, controlling the second clamping jaw to clamp the pipeline for the second time to avoid the displacement of the pipeline during operation;

S3, driving the moving support by the moving mechanism to move, and finely adjusting the position of the pipeline to ensure the accurate position of the pipeline; and S4, controlling the second clamping jaw to fine-tune and clamp the pipeline again.

* * * * *